US010101905B1

(12) United States Patent
Sivertsen et al.

(10) Patent No.: US 10,101,905 B1
(45) Date of Patent: Oct. 16, 2018

(54) PROXIMITY-BASED INPUT DEVICE (71) Applicant: American Megatrends, Inc., Norcross, GA (US)

(72) Inventors: Clas G. Sivertsen, Lilburn, GA (US); Faycal Guennar, Taipei (TW)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/708,733

(22) Filed: Dec. 7, 2012

(51) Int. Cl.
    G06F 3/041      (2006.01)
    G06F 3/0488     (2013.01)

(52) U.S. Cl.
    CPC ............................... *G06F 3/04886* (2013.01)

(58) Field of Classification Search
    CPC ....... G06F 2203/04101; G06F 3/03547; G06F 3/04886; G06F 3/017; G06F 3/0488
    USPC ...................... 178/18.01–12.04; 345/173–179
    See application file for complete search history.

(56) References Cited

U.S. PATENT DOCUMENTS

| | | | |
|---|---|---|---|
| 7,145,552 B2 | 12/2006 | Hollingsworth | |
| 2001/0030667 A1* | 10/2001 | Kelts | ............................ 345/854 |
| 2007/0013674 A1 | 1/2007 | Wooley | |
| 2007/0057922 A1 | 3/2007 | Schultz et al. | |
| 2007/0075983 A1 | 4/2007 | Chiu et al. | |
| 2007/0242056 A1 | 10/2007 | Engelhardt et al. | |
| 2008/0122796 A1* | 5/2008 | Jobs | ...................... G06F 3/0488 345/173 |
| 2008/0252616 A1* | 10/2008 | Chen | ............................ 345/175 |
| 2009/0256817 A1* | 10/2009 | Perlin | ................... G06F 3/0233 345/174 |
| 2009/0303200 A1 | 12/2009 | Grad | |
| 2010/0005390 A1* | 1/2010 | Bong | ............................. 715/702 |
| 2010/0053322 A1* | 3/2010 | Marti | ...................... G06F 3/011 348/135 |
| 2010/0095240 A1* | 4/2010 | Shiplacoff | ............. G06F 3/0483 715/784 |
| 2010/0149100 A1* | 6/2010 | Meiby | ................... G06F 1/1626 345/168 |
| 2010/0225604 A1* | 9/2010 | Homma et al. | ............... 345/173 |
| 2010/0251161 A1 | 9/2010 | Fong et al. | |

(Continued)

OTHER PUBLICATIONS

Wigdor, Daniel et al.; Lucid touch: A See-Through Mobile Device; 2007, saved here as Wigdor.pdf.*

*Primary Examiner* — Srilakshmi K Kumar
*Assistant Examiner* — Brent D Castiaux
(74) *Attorney, Agent, or Firm* — Newport IP, LLC | Shigeta Hope (57) ABSTRACT

A proximity-based input device is disclosed. The proximity-based input device may include a display device, a detection surface, an input detection unit, and a processor. The input detection unit detects the presence of a target in proximity to the detection surface and generates a corresponding proximity signal. The input detection unit also detects contact on the detection surface and any movement or breakage in movement of the contact, and generates a corresponding touch signal. The processor may display an object on the display device, displays a virtual image of the target in proximity to the detection surface on the display device with reference to the proximity signal, highlights the object on the display device in response to the virtual image of the target overlapping the object, and selects the object in response to receiving the touch signal from the input detection unit when the object is highlighted.

15 Claims, 6 Drawing Sheets

(56) References Cited

U.S. PATENT DOCUMENTS

| | | | |
|---|---|---|---|
| 2011/0063224 A1* | 3/2011 | Vexo | G06F 3/04886 345/168 |
| 2011/0155479 A1* | 6/2011 | Oda et al. | 178/18.06 |
| 2011/0163989 A1* | 7/2011 | Singhal | G06F 3/04883 345/173 |
| 2013/0057475 A1* | 3/2013 | Duggan | G06F 3/0216 345/168 |

* cited by examiner

PROXIMITY-BASED INPUT DEVICE

BACKGROUND

Many different types of input devices may be used to provide data and control signals to information processing systems (e.g., computers, smartphones, and handheld game consoles). Each type of input device, however, typically has one or more drawbacks. For example, the keyboard, which is the most widely used input device for information processing systems, is bulky as a result of the large number of required keys. Attempts to reduce the size of the keyboard have been only minimally successful.

Moreover, when using an external-type keyboard, the user typically places the keyboard on a flat surface to provide for support while typing. However, in some instances, a flat surface may not be readily available. For example, when an external keyboard is used with an Internet-capable television, a user may be sitting on a couch or chair in front of the television and there may not be a table in the vicinity of the couch for positioning of the external keyboard. This problem is typically addressed by placing the external keyboard on the user's lap. However, such positioning of an external keyboard usually does not provide for good stability, nor does it allow the user to sit comfortably while using the external keyboard.

An on-screen keyboard might also be provided with some types of computing systems. For example, some computer operating systems allow the user to display an on-screen keyboard. However, such an on-screen keyboard is typically manipulated using a mouse or track pad, which often makes the process of typing words and sentences slow and tedious. This can be frustrating to a user of such devices.

It is with respect to these and other considerations that the disclosure presented herein has been made.

SUMMARY

A proximity-based user input device is disclosed herein that may solve some or all of the problems described above. In one implementation, the proximity-based user input device includes a processor, a display device, a detection surface, and an input detection unit configured to detect the presence of a target in proximity to the detection surface and any movement or break in movement thereof. The input detection unit is also configured to generate a proximity signal corresponding to the detected target. In some embodiments, the input detection unit might also detect contact on the detection surface and any movement or breakage in movement thereof, and to generate at least one corresponding touch signal. The processor may be configured to display an object on the display device, display a virtual image of the target in proximity to the detection surface on the display device with reference to the proximity signal, highlight the object on the display device in response to the virtual image of the target overlapping the object, and select the object in response to receiving the touch signal from the input detection unit when the object is highlighted.

In another embodiment, the proximity-based user input device includes two detection surfaces. In this embodiment, the input detection unit may be configured to detect the presence of a first target in proximity to the first detection surface and any movement or breaking thereof, and to generate a corresponding first proximity signal. The input detection unit might also be configured to detect the presence of a second target in proximity to the second detection surface and any movement or breaking thereof, and to generate a corresponding second proximity signal. The input detection unit might also be configured to detect contact on the first detection surface and any movement or breaking thereof and generate a corresponding first touch signal and to detect contact on the second detection surface and any movement or breaking thereof and generate a corresponding second touch signal in response thereto. The input detection unit might also output the first proximity signal, the second proximity signal, the first touch signal, and the second touch signal to an external electronic device via an appropriate interface.

The subject matter described herein might also be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

A proximity-based input device is disclosed herein. In the following detailed description, references are made to the accompanying drawings that form a part hereof, and in which are shown by way of illustration specific embodiments or examples. Referring now to the drawings, in which like numerals represent like elements through the several figures, aspects of the configuration and operation of a proximity-based input device will be provided.

Figure 1:
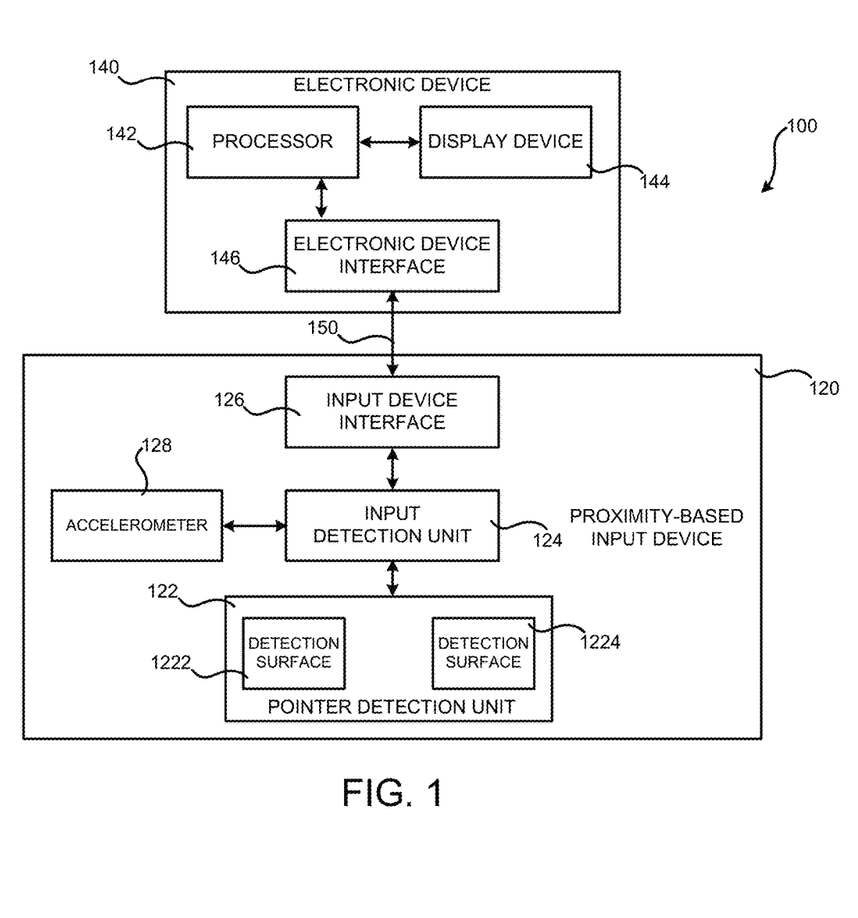
FIG. 1 is a block diagram illustrating aspects of the configuration of a proximity-based input device, according to one embodiment disclosed herein.

FIG. 1 is a block diagram illustrating aspects of the configuration and operation of a proximity-based input device 120, according to one embodiment disclosed herein. As shown in FIG. 1, a proximity-based input device 120 is disclosed that includes a pointer detection unit 122, an input detection unit 124, an input device interface 126, and an accelerometer 128 in one implementation. The proximity-based input device 120 is connected to the electronic device 140. The electronic device 140 includes a processor 142, a display device 144, and an electronic device interface 146.

In the description to follow, the proximity-based input device 120 is described as being an external input device to the electronic device 140. The electronic device 140 may be a personal computer, a television, a television set-top box, a game console, or another type of remotely controllable electronic device. It should be appreciated, however, that in some embodiments the combination of the proximity-based input device 120 and the electronic device 140 may be provided as a single system 100. As an example, the proximity-based input device 120 and the electronic device 140 might be combined as a singled unit that forms the system 100. The system 100 in such an implementation may be a handheld game console, a smartphone, a tablet computer, a mobile phone, a portable media player, a wireless remote control, a personal navigation device, or another type of electronic device. In embodiments where the proximity-based input device 120 and the electronic device 140 are combined to form the system 100, the input device interface 126 and the electronic device interface 146 may be omitted from the configuration of the system 100, and the input detection unit 124 of the proximity-based input device 120 may communicate directly with the processor 142 of the electronic device 140. Other combinations will be apparent to those skilled in the art.

In one embodiment, the pointer detection unit 122 includes a first detection surface 1222 and a second detection surface 1224. Each of the first and second detection surfaces 1222 and 1224 may be a combination touch- and proximity-sensitive surface. That is, each of the first and second detection surfaces 1222 and 1224 may be used for detection of touches made thereon, as well as objects in proximity thereto (i.e. in the space above the detection surface). As used herein, the phrase "in proximity" is utilized to describe objects that are near but not touching the detection surfaces 1222 and 1224. In some embodiments, the pointer detection unit 122 may comprise a single detection surface, rather than the first and second detection surfaces 1222 and 1224. Other embodiments might utilize more than two detection surfaces.

The input detection unit 124 detects contact on the first and second detection surfaces 1222 and 1224 and any movement or breakage in movement thereupon. The input detection unit 124 may also detect the presence of a target (i.e. a finger of a user) in proximity to the first and second detection surfaces 1222 and 1224 and any movement or breakage in movement (i.e. the target is no longer close enough to be sensed). To simplify the explanation to follow, such contact on the first and second detection surfaces 1222 and 1224 and any movement or breakage in movement thereupon, and the presence of a target in proximity to the first and second detection surfaces 1222 and 1224 and any movement or breakage in movement thereof may be referred to as "pointer events."

In some embodiments, the input detection unit 124 may also detect speed (magnitude), velocity (both magnitude and direction), and acceleration (a change in magnitude and/or direction) of the contact on the first and second detection surfaces 1222 and 1224, as well as speed, velocity, and acceleration of a target that is in proximity to the first and second detection surfaces 1222 and 1224. The input detection unit 124 is able to perform such detection with respect to single contacts performed using a single finger (or object, such as a stylus), or with respect to multiple simultaneous contacts performed using two or more fingers or objects. Moreover, the input detection unit 124 is able to perform such detection with respect to a single target in proximity to the first and second detection surfaces 1222 and 1224, in which the single target may be a single finger or object, or with respect to multiple simultaneous targets in proximity to the first and second detection surfaces 1222 and 1224, in which the multiple targets may be two or more fingers or objects.

It should be appreciated that, during detection as described above, the input detection unit 124 simultaneously determines the location of pointer events in relation to the first and second detection surfaces 1222 and 1224. For example, the input detection unit 124 may determine that a hovering gesture is being performed by the user (i.e., placing a finger over a location and leaving it there) over a specific location of the first detection surface 1222 and that a touching gesture is subsequently performed at the specific location of the first detection surface 1222 and that the user then released from the specific location of the first detection surface 1222 after making the contact thereon. The input detection unit 124 generates corresponding command signals that include information of the type of pointer event, or events, as well as its location.

In some embodiments, the command signals generated by the input detection unit 124 comprise proximity signals indicating detection of objects in proximity to the first and second detection surfaces 1222 and 1224, touch signals indicating detection of touches on the first and second detection surfaces 1222 and 1224, and/or release signals indicating detection of the release of the touches on the first and second detection surfaces 1222 and 1224. Each of these signals contains information describing the location of the pointer events on or above the first and second detection surfaces 1222 and 1224.

In one embodiment, an absolute mapping scheme is utilized between the proximity-based input device 120 and the electronic device 140. That is, between the first and second detection surfaces 1222 and 1224 and either the entire screen of the display device 144 of the electronic device 140 or specific portions of the screen of the display device 144. Using an absolute mapping, each location of each of the first and second detection surfaces 1222 and 1224 has a corresponding position on the screen of the display device 144, or on a specific portion of the screen of the display device 144. This may be contrasted to relative mapping, in which contact on the first and second detection surfaces 1222 and 1224 results in movement starting from where the last contact took place, regardless of the actual location on the first and second detection surfaces 1222 and 1224. Relative mapping is a common technique used with trackpads found on laptop computers and other types of devices, as will be described in greater detail below.

The input device interface 126 is used to transmit the command signals to the electronic device 140. That is, the input detection unit 124 outputs the command signals to the electronic device 140 via the input device interface 126. The electronic device 140 receives the command signals via the electronic device interface 146. In some embodiments, the input device interface 126 includes a wired interface, such as a Universal Serial Bus ("USB") port, a serial port, a parallel port, or another type of suitable wired interface. In these implementations, the input detection unit 124 transmits the command signals to the electronic device 140 via the input device interface 126 and a cable 150. In other embodiments, the input device interface 126 includes a wireless interface, such as a Bluetooth® interface or a radio frequency ("RF") interface. In these embodiments, the input detection unit 124 wirelessly transmits the command signals to the electronic device 140 via the input device interface 126. Similarly, the electronic device interface 146 of the electronic device 140 may comprise a wired interface or a wireless interface compatible with the input device interface 126 of the proximity-based input device 120.

Figure 2:
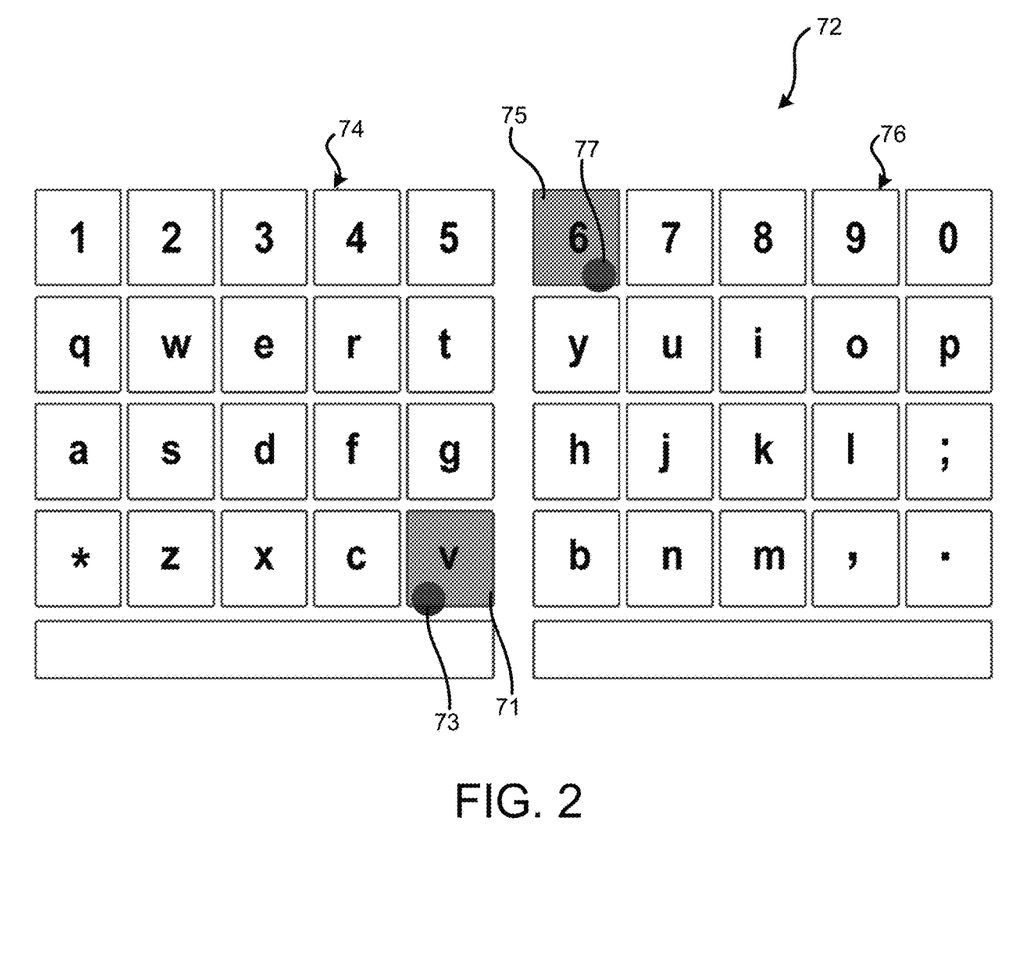
FIG. 2 is a screen diagram showing aspects of virtual keyboard that may be controlled using a proximity-based input device in one embodiment disclosed herein.

Various aspects of the cooperation between the electronic device 140 and the proximity-based input device 120 will now be described. In particular, when the proximity-based input device 120 is connected to the electronic device 140, such as through a USB connection or an RF connection as described above, the processor 142 of the electronic device 140 performs control so that a virtual keyboard is displayed on the display device 144 thereof. FIG. 2 shows one example of a virtual keyboard 72 that may be displayed on the screen of the display device 144. In the example shown in FIG. 2, the virtual keyboard 72 is divided into a left section 74 and a right section 76 corresponding, respectively, to the first detection surface 1222 and the second detection surface 1224. That is, in this example, the first detection surface 1222 of the pointer detection unit 122 is mapped absolutely to the left section 74 of the virtual keyboard 72, and the second detection surface 1224 of the pointer detection unit 122 is mapped absolutely to the right section 76 of the virtual keyboard 72. In some embodiments, mapping is performed by the processor 142 of the electronic device 140, such as with reference to the location information contained in the command signals generated by the input detection unit 124.

Figure 3:
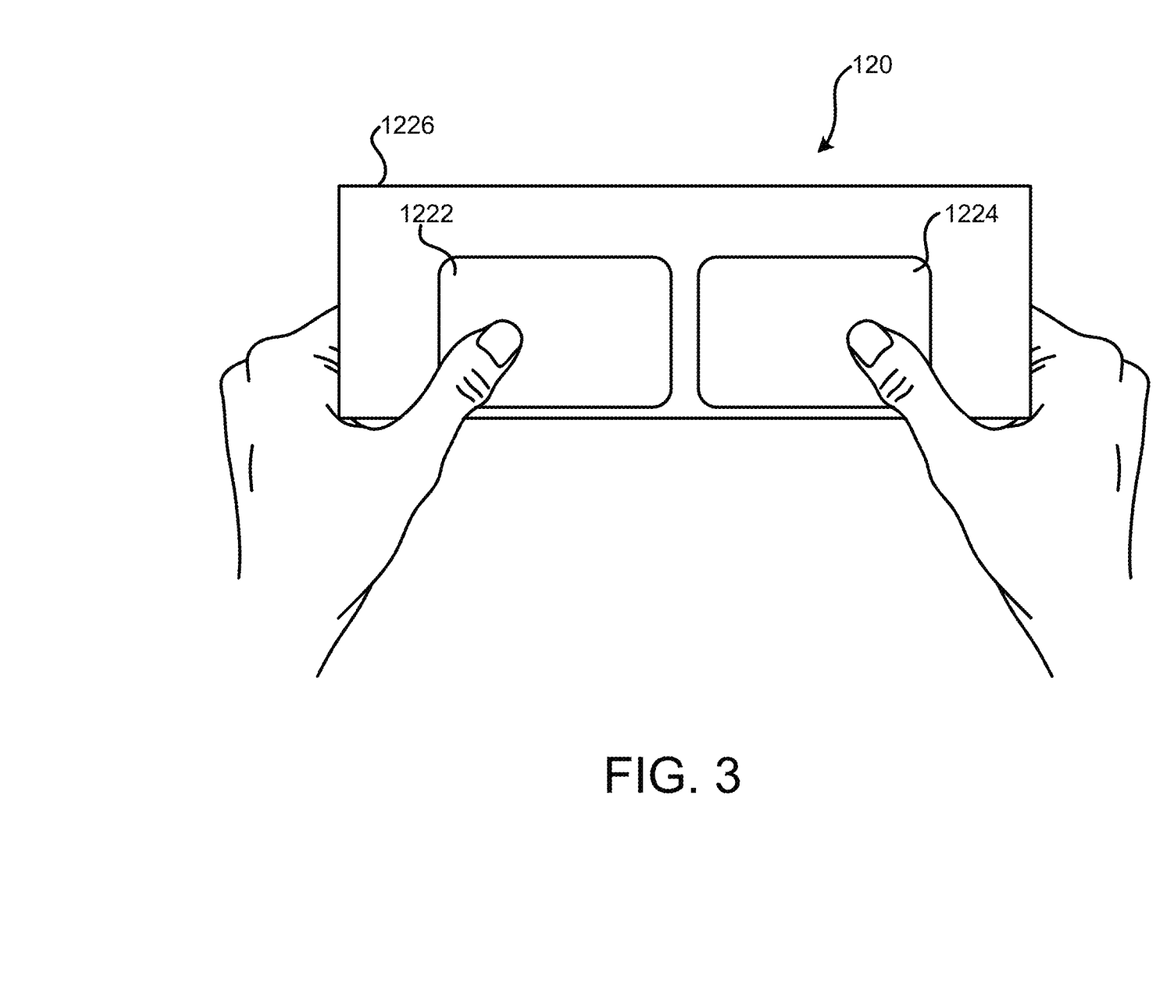
FIG. 3 is pictorial diagram showing one exemplary layout for a proximity-based input device, according to one embodiment disclosed herein.

FIG. 3 is pictorial diagram showing one exemplary layout for a proximity-based input device 120, according to one embodiment disclosed herein. As shown in FIG. 3, the housing of the proximity-based input device 120 may be substantially rectangular in some embodiments. The first and second detection surfaces 1222 and 1224 may be substantially rectangular and may have substantially the same outer dimensions as one another. When held in a horizontal orientation as shown in FIG. 3, the first and second detection surfaces 1222 and 1224 may be adjacent to each other in a horizontal direction with a space provided there between. When held in a vertical position (not shown), the first and second detection surfaces 1222 and 1224 may be vertically spaced apart from one other. Since the first and second detection surfaces 1222 and 1224 are not disposed such that one detection surface 1222 or 1224 surrounds the other detection surface 1222 or 1224, it may also be stated that first and second detection surfaces 1222 and 1224 are non-concentric.

When used in the configuration shown in FIG. 3, the proximity-based input device 120 can be held in both hands when positioned horizontally, and the first and second detection surfaces 1222 and 1224 can be operated with the thumbs of the user. For example, the detection surface 1222 can be operated with the thumb on the left hand of the user and the second detection surface 1224 can be operated with the thumb on the right hand of the user. When positioned vertically, the proximity-based input device 120 can be held in one hand and operated using one thumb.

In some embodiments, the proximity-based input device 120 includes a housing which forms the outer surface of the proximity-based input device 120. The first and second detection surfaces 1222 and 1224 may be disposed on an upper surface of the housing. The housing of the proximity-based input device 120 may be sized to allow the proximity-based input device 120 to be held comfortably in the hands by the user and to allow operation of the first and second detection surfaces 1222 and 1224 with the thumbs of the user, as described above.

Assuming a horizontal orientation as shown in FIG. 3, when the user places the thumb of his or her left hand over the first detection surface 1222, the input detection unit 124 generates corresponding proximity signals and sends the proximity signals to the electronic device 140 via the input device interface 126. In response thereto, the processor 142 of the electronic device 140 causes an indicator to be displayed that indicates the position of the thumb in the left section 74 of the virtual keyboard 72, such as by displaying a dot 73 on the left section 74 of the virtual keyboard 72, as shown in FIG. 2. Stated differently, the processor 142 causes an indicator, such as a virtual image of the thumb, to be displayed on the display device 144 of the electronic device 140. Such a virtual image of the thumb may take many forms, such as the dot 73 described above, an image that looks like an actual thumb, an image that looks like a typical computer icon, etc. Also, in some embodiments, the processor 142 of the electronic device 140 causes the key 71 in the left section 74 of the virtual keyboard 72 corresponding to the position of the dot 73 to be highlighted, as shown in FIG. 2. The processor 142 may also generate a similar display on the right section 76 of the virtual keyboard 72 in response to receiving proximity signals from the input detection unit 124 indicating that the user has placed the thumb of his or her right hand over the second detection surface 1224. For instance, a dot 77 might be displayed. Additionally, the key 75 corresponding to the position of the dot 75 may be highlighted in some manner.

In some embodiments, highlighting of the keys shown in the virtual keyboard 72 may involve a determination by the processor 142 of the electronic device 140 as to which key out of two or more keys should be highlighted. For example, in some situations, the dot displayed on the left or right section 74 or 76 of the virtual keyboard 72 may overlap two or more keys. When this occurs, the processor 142 of the electronic device 140 may identify the key that the dot overlaps the most and then proceed to highlight that key. An example of this is shown in the right section 76 of the virtual keyboard 72, in which the key 75 corresponding to "6" is highlighted instead of the key corresponding to "y" since the dot overlaps the "6" key more than it does the "y" key.

When a user contacts the first and second detection surfaces 1222 and 1224, the input detection unit 124 generates corresponding touch signals in the manner described above. When the user releases the contact from the first and second detection surfaces 1222 and 1224, the input detection unit 124 generates corresponding release signals. When the user contacts and releases in such a manner on the first and second detection surfaces 1222 and 1224, keys on the virtual keyboard 72 may be selected. For example, when the user contacts and releases on the first detection surface 1222 at a location thereon resulting in the highlighting of the key 71 on the left section 74 of the virtual keyboard 72, then this letter is selected. In some embodiments, the processor 142 of the electronic device 140 performs control so that selected letters, numbers, etc. are displayed on the display device 144 of the electronic device 140 to thereby form words and sentences with the selected letters. In some embodiments, only the touch signals are required for key selection, and the processor 142 of the electronic device 140 does not wait to also receive the release signals to select keys, and in some embodiments, the release signals may not even be generated by the input detection unit 124 of the proximity-based input device 120.

As described above, the first and second detection surfaces 1222 and 1224 are absolutely mapped to the screen of the display device 144 in one embodiment. The processor 144 of the electronic device 140 may perform the absolute mapping, such as by using location information contained in the command signals generated by the input detection unit 124. Also, as described briefly above, such absolute mapping may be between the first and second detection surfaces 1222 and 1224 and specific portions of the screen of the display device 144. For example, when the virtual keyboard 72 is shown in only a portion of the screen of the display device 144, the first detection surface 1222 may be mapped to the left section 74 of the virtual keyboard 72 and the second detection surface 1224 may be mapped to the right section 76 of the virtual keyboard 72.

In some embodiments, the proximity-based input device 120 may have a multitude of modes that may be changed in a variety of ways. For example, the processor 142 of the electronic device 140 may display the virtual keyboard 72 so that a particular key is displayed thereon, such as the key showing the asterisk symbol ("*"). When a user contacts and releases the first detection surface 1222 at a location thereon corresponding to where the * key is highlighted when hovering over this key, the mode of the electronic keyboard 100 may be changed. As an example, in response to receiving touch and release signals from the input detection unit 124 of the proximity-based input device 120 corresponding to manipulation of the * key, the processor 142 of the electronic device 140 may cause another virtual keyboard to be displayed on the display device 144, such as the virtual keyboard 72' shown in FIG. 4. In this case, the virtual keyboard 72' is a keyboard utilized to input Korean language characters. Hence, in some embodiments, the virtual keyboard may be changed from a first type, such as the virtual keyboard 72 shown in FIG. 2, to a second type, such as the virtual keyboard 72' shown in FIG. 4.

Figure 4:
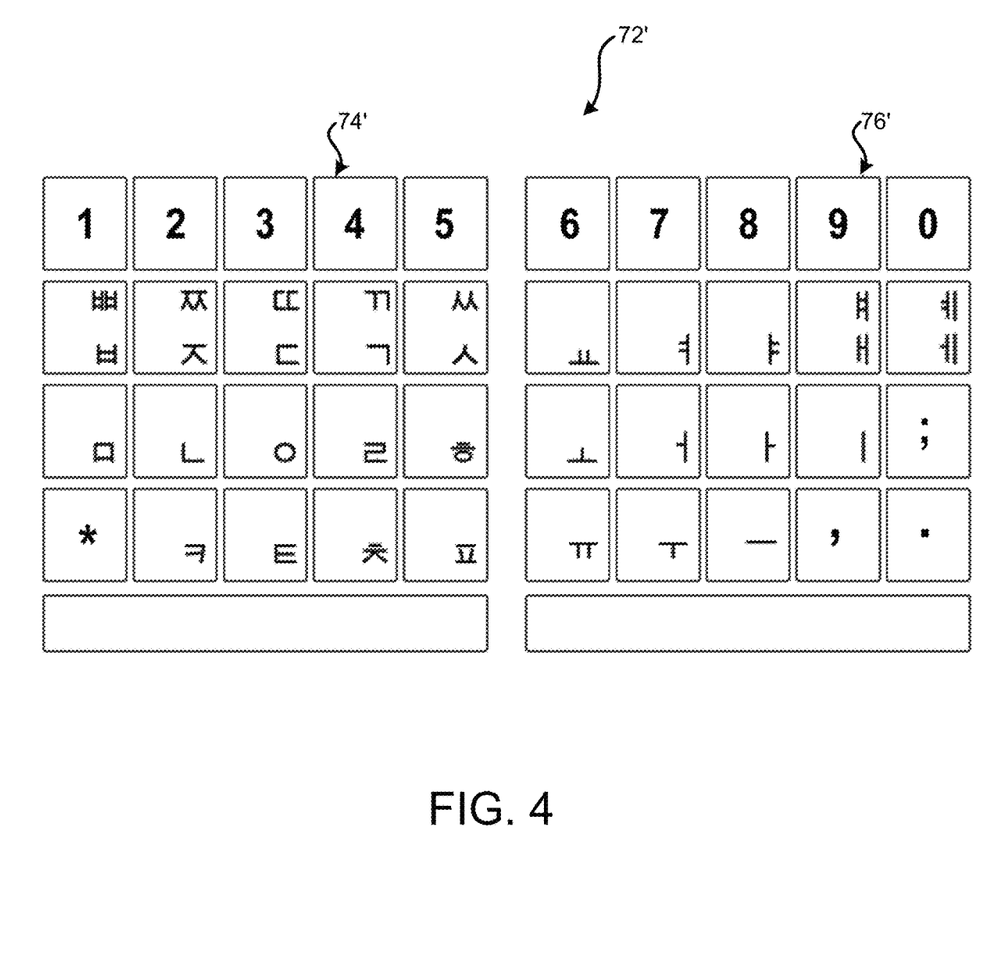
FIG. 4 is a screen diagram showing aspects of another virtual keyboard that may be controlled using a proximity-based input device in one embodiment disclosed herein.

A user may operate the proximity-based input device 120 when the virtual keyboard 72' shown in FIG. 4 is displayed in a manner similar to the way the proximity-based input device 120 is operated when the virtual keyboard 72 shown in FIG. 2 is displayed. That is, when the user places the thumbs of his or her hands over the first and second detection surfaces 1222 and 1224, the input detection unit 124 generates corresponding proximity signals and sends the proximity signals to the electronic device 140 via the input device interface 126

In response thereto, the processor 142 of the electronic device 140 causes the positions of the thumbs to be shown on the left and right sections 74', 76' of the virtual keyboard 72', such as by displaying dots on the virtual keyboard 72' and by highlighting the keys corresponding to the positions of the dots, as described above. When the user contacts the first and second detection surfaces 1222 and 1224, the input detection unit 124 generates corresponding touch signals. When the user releases the contact from the first and second detection surfaces 1222 and 1224, the input detection unit 124 generates corresponding release signals. When the user contacts and releases in such a manner on the first and second detection surfaces 1222 and 1224, keys on the virtual keyboard 72' may be selected.

In some embodiments, the user performs a particular gesture on either (or both) of the first and second detection surfaces 1222 and 1224 to change modes and, in response thereto, the input detection unit 124 sends a corresponding mode change signal to the electronic device 140 via the input device interface 126. For example, the user may perform a double tap gesture on the first detection surface 1222 and in response thereto, the input detection unit 124 interprets the double tap gesture as a command to change modes. The input detection unit 124 then generates and sends a corresponding mode change signal to the electronic device 140 through the input device interface 126.

In some embodiments, the accelerometer 128 of the proximity-based input device 120 is also used for changing the mode of operation of the proximity-based input device 120. The accelerometer 128 measures acceleration of the proximity-based input device 120 and outputs corresponding acceleration signals. The accelerometer 128 may comprise a single- or multi-axis accelerometer. Many movements of the proximity-based input device 120 may be used to cause the mode of the proximity-based input device 120 to be changed, such as a tilting motion followed by returning the proximity-based input device 120 back to a normal position, or a rightward jerking motion of the proximity-based input device 120, etc.

In response to such movement of the proximity-based input device 120, the accelerometer 128 generates corresponding acceleration signals and, in response to receiving the acceleration signals, the input detection unit 124 interprets the acceleration signals as commands to change modes. The input detection unit 124 then generates corresponding mode change signals and outputs the mode change signals to the electronic device 140 through the input device interface 126. Finally, in response to receiving the mode change signals through the electronic device interface 146, the processor 142 of the electronic device 140 may change modes of operation of the electronic device 140. As an example, the processor 142 of the electronic device might cause the virtual keyboard displayed on the display device 144 to be changed from one type to another.

An example was provided above in which the displayed virtual keyboard was changed from the virtual keyboard 72 shown in FIG. 2 to the virtual keyboard 72' shown in FIG. 4. In this case, the virtual keyboard is changed from that corresponding to one phonetic alphabet to that corresponding to another phonetic alphabet (i.e., from a virtual keyboard for one language to a virtual keyboard for another language). However, the disclosure presented herein is not limited in this regard and the virtual keyboard displayed may be changed in a variety of ways, such as a change involving the particular layout used (for example, from the layout shown in FIG. 2 to a layout for a full 104-key Windows® keyboard), a change involving the content of the keyboard (for example, from the layout including letters, numbers, and symbols to a layout including only numbers), etc. Moreover, in some embodiments, mode of operation may be changed among a plurality of possible modes, rather than between only two modes. For example, certain gestures may correspond to specific modes and certain movements of the proximity-based input device 120 may correspond to specific modes of operation, and the user performing these gestures and movements of the proximity-based input device 120 may change the mode.

As also described above, when the proximity-based input device 120 is connected to the electronic device 140, the processor 142 of the electronic device 140 causes a virtual keyboard to be displayed on the display device 144 thereof, such as the virtual keyboard 72 shown in FIG. 2 or the virtual keyboard 72' shown in FIG. 4. In some embodiments, by default, the processor 142 causes the virtual keyboard to be displayed at the bottom of the screen of the display device 144 when the proximity-based input device 120 is connected to the electronic device 140.

In other embodiments, the location that the virtual keyboard is displayed on the display of the electronic device 140 may be controlled by the user manipulating the proximity-based input device 120. As an example, the user may manipulate the first and second detection surfaces 1222 and 1224 to move the virtual keyboard, such as by continuously contacting the first detection surface 1222 while, at the same time, sliding a finger on the second detection surface 1224. In this case, the input detection unit 124 outputs command signals corresponding to these pointer events, and in response, the processor 142 of the electronic device 140 causes the virtual keyboard to be moved to a desired location on the screen of the display device 144, as controlled by the sliding operation of the user. As another example, the user may perform a specific gesture on either or both the first and second detection surfaces 1222 and 1224 to move the virtual keyboard to a specific location, such as to the top of the screen of the display device 144 rather than to the bottom of the screen of the display device 144.

Figure 5:
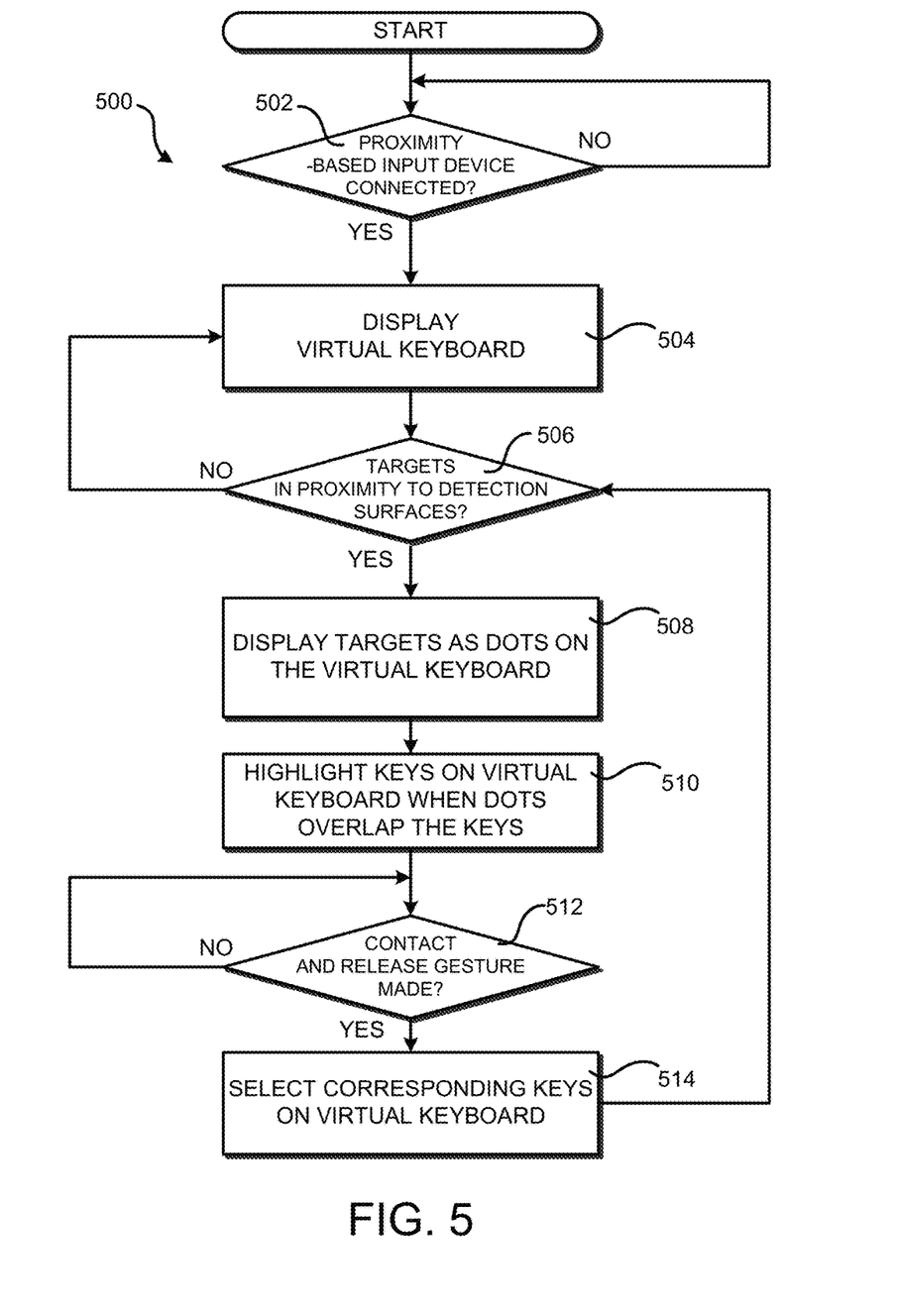
FIG. 5 is a flow diagram showing aspects of one routine presented herein for controlling a virtual keyboard using a proximity-based input device, according to one embodiment disclosed herein.

FIG. 5 is a flow diagram showing aspects of one illustrative routine 500 presented herein for controlling a virtual keyboard using a proximity-based input device 120, according to one embodiment disclosed herein. The logical operations of the various implementations presented herein are implemented (1) as a sequence of computer implemented acts or program modules running on a computing system and/or (2) as interconnected machine logic circuits or circuit modules within the touch controller 100. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In some embodiments, a computer-readable storage medium, such as a memory in the electronic device 140 and/or the proximity-based input device 120, stores program code executable on a processor for performing the various operations disclosed herein. Although the description of computer-readable storage media contained herein refers primarily to a memory device, it should be appreciated by those skilled in the art that computer-readable storage media can be any available media that can be accessed by a processor. Computer-readable storage media may include volatile and non-volatile, removable and non-removable media implemented in any method or technology for the non-transitory storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a processor. Computer-readable storage media does not include transitory signals.

The routine 500 begins at operation 502, where a determination is made as to whether the proximity-based input device 120 is connected to the electronic device 140. If the proximity-based input device 120 is not connected to the electronic device 140, the routine 500 proceeds back to operation 502 for another such determination. If the proximity-based input device 120 is connected to the electronic device 140, the routine 500 continues to operation 504. The processor 142 and/or the proximity-based input device 120 might perform the determination process described in operation 502.

At operation 504, a virtual keyboard is displayed on the display device 144 of the electronic device 140. In this example, it is assumed that the virtual keyboard 72 including the left section 74 and the right section 76 shown in FIG. 2 is displayed on the display device 144 of the electronic device 140. It should be appreciated, however, that other types and configurations of keyboards might also be utilized.

From operation 504, the routine 500 continues to operation 506, where the input detection unit 124 makes a determination as to whether a target is in proximity to any one or both of the first detection surface 1222 and the second detection surface 1224. If there is no target in proximity to either or both of the first detection surface 1222 and the second detection surface 1224, the routine 500 proceeds back to operation 504 for another determination.

If, at operation 506, the input detection unit 124 determines that a target is in proximity to any one or both of the first detection surface 1222 and the second detection surface 1224, the routine 500 continues to operation 508, where any target in proximity to the first detection surface 1222 is displayed as a dot or other type of indicator at a corresponding location on the left section 74 of the virtual keyboard 72 and any target in proximity to the second detection surface 1224 is displayed as a dot or other type of indicator at a corresponding location on the right section 76 of the virtual keyboard 72. From operation 508, the routine 500 continues to operation 510, where keys on the left and right sections 74 and 76 of the virtual keyboard 72 are highlighted when any dot displayed on the left and right sections 74 and 76 of the virtual keyboard 72 overlaps the keys.

From operation 510, the routine 500 continues to operation 512, where a determination is made as to whether a contact and release gesture has been made on the first detection surface 1222 or the second detection surface 1224. If a contact and release gesture has not been made on the first detection surface 1222 or the second detection surface 1224, the routine 500 proceeds back to operation 512 for another such determination. If a contact and release gesture has been made on the first detection surface 1222 or the second detection surface 1224, the routine 500 continues to operation 514.

At operation 514, the key on the left section 74 of the virtual keyboard 72 corresponding to the location of the contact and release gesture on the first detection surface 1222 or the key on the right section 76 of the virtual keyboard 72 corresponding to the location of the contact and release gesture on the second detection surface 1224 is selected. From operation 514, the routine 500 proceeds to operation 506, as described above.

As mentioned above, in some embodiments, the proximity-based input device 120 and the electronic device 140 may be combined to form the system 100. Moreover, in these and other embodiments, manipulation of the proximity-based input device 120 by the user may be for controlling any objects displayed on the display device 144, and not necessarily for controlling a virtual keyboard displayed on the display device 144. A method related to such embodiments will now be described.

Figure 6:
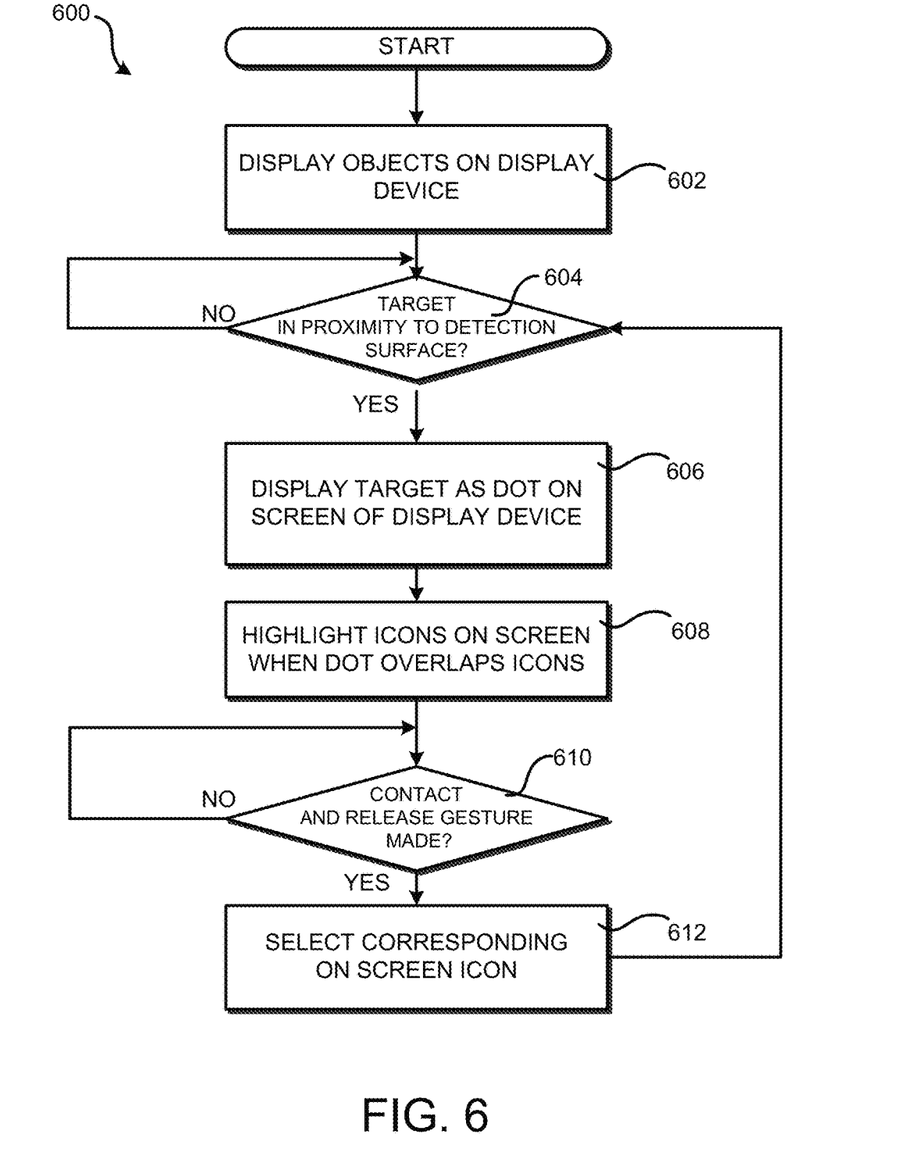
FIG. 6 is a flow diagram showing aspects of one routine presented herein for controlling objects displayed on a display of a system utilizing a proximity-based input device, according to one embodiment disclosed herein.

FIG. 6 is a flow diagram showing aspects of one routine 600 presented herein for controlling objects displayed on a display device 144 of a system 100 utilizing a proximity-based input device 120, according to one embodiment disclosed herein. In order to simplify the explanation to follow, the pointer detection unit 122 of the system 100 is described as having a single detection surface, namely, the first detection surface 1222. It should be appreciated that more than one detection surface might be utilized in other embodiments.

The routine 600 begins at operation 602, where objects are displayed on the display device 144. As an example, the objects may be icons for performing commands in various software tools or data files for the system 100. In some embodiments, the objects may be a virtual keyboard, such as the virtual keyboard 72 of FIG. 2 or the virtual keyboard 72' of FIG. 4. In the example described below with regard to FIG. 6, it will be assumed that the displayed objects are icons.

From operation 602, the routine 600 continues to operation 604, where a determination is made as to whether a target is in proximity to the first detection surface 1222. If there is no target in proximity to the first detection surface 1222, the routine 600 proceeds back to operation 604 for another such determination.

If, at operation 604, a target is detected in proximity to the first detection surface 1222, the routine 600 continues to operation 606. At operation 606, any target in proximity to the first detection surface 1222 is displayed as a dot or other type of indicator at a corresponding location on the screen of the display device 144. The first detection surface 1222 may be absolutely mapped to the screen of the display device 144 in the manner described above. From operation 606, the routine 600 continues to operation 608, where icons on the screen of the display device 144 are highlighted when any dot, or other type of indicator, displayed on the screen of the display device 144 overlaps the icons.

From operation 608, the routine 600 continues to operation 610, where a determination is made as to whether a contact and release gesture has been made on the first detection surface 1222. If a contact and release gesture has not been made on the first detection surface 1222, the routine 600 proceeds back to operation 610 for another determination. If a contact and release gesture has been made on the first detection surface 1222, then the routine 600 proceeds to operation 612.

At operation 612, the icon corresponding to the location of the contact and release gesture on the first detection surface 1222 is selected. In some embodiments, the routine 600 may include a further determination as to whether the contact and release gesture corresponds to the location of an icon on the display device 144, and selection is performed only when the gesture does correspond to the location of an icon. From operation 612, the routine 600 proceeds back to operation 604, as described above.

Based on the foregoing, it should be appreciated that technologies have been described herein for a proximity-based input device. Although the embodiments described herein have been described in language specific to hardware structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:
1. A system comprising:
a display device;
an input device separate from the display device and comprising a first detection surface, a second detection surface, and an input detection unit, the input detection unit configured to
  detect a presence of a first target in proximity to the first detection surface and any movement or breaking thereof,
  generate at least one corresponding first proximity signal,
  detect contact on the first detection surface and any movement or breaking thereof,
  generate at least one corresponding first touch signal,
  detect a presence of a second target in proximity to the second detection surface and any movement or breaking thereof,
  generate at least one corresponding second proximity signal,
  detect contact on the second detection surface and any movement or breaking thereof, and
  generate at least one corresponding second touch signal; and
a processor configured to
  display, at a defined location on a screen of the display device, a keyboard having a left section and a right section,
  display, on the display device, one or both of a first image indicating the presence of the first target with reference to the first proximity signal and a second image indicating the presence of the second target with reference to the second proximity signal, wherein at least one of the first image or the second image overlaps at least one key of the keyboard,
  highlight the at least one key on the keyboard by highlighting a key in the left section of the keyboard in response to the first image overlapping the key in the left section, or highlight a key in the right section of the keyboard in response to the second image overlapping the key in the right section, wherein both highlighting the at least one key on the keyboard and displaying one or both of the first image or the second image is based at least in part on one of the first proximity signal or the second proximity signal,
  select one of the keys in the left section of the keyboard in response to receiving the first touch signal from the input detection unit when the one of the keys in the left section of the keyboard is highlighted, or select one of the keys in the right section of the keyboard in response to receiving the second touch signal from the input detection unit when the one of the keys in the right section of the keyboard is highlighted, and
  change the defined location to a desired location on the screen in response to continuously contacting the first detection surface and performing a gesture on the second detection surface while the first detection surface is continuously contacted.
2. The system of claim 1, wherein:
the input detection unit is further configured to generate a mode change signal in response to detecting a particular gesture on or in proximity to at least one of the first detection surface and the second detection surface, and wherein
the processor is further configured to change the keyboard from a first type to a second type in response to receiving the mode change signal from the input detection unit.

3. The system of claim 1, further comprising an accelerometer configured to measure acceleration of the system and output corresponding acceleration signals, and wherein:
- the input detection unit is further configured to generate a mode change signal in response to receiving an acceleration signal from the accelerometer for changing modes, and wherein
- the processor is further configured to change the keyboard from a first type corresponding to a first phonetic alphabet to a second type corresponding to a second phonetic alphabet in response to receiving the mode change signal from the input detection unit.

4. The system of claim 1, wherein:
- when the first image overlaps more than one key in the left section of the keyboard or when the second image overlaps more than one key in the right section of the keyboard, the processor is further configured to determine the key that the first image overlaps the most in the left section of the keyboard or the key that the second image overlaps the most in the right section of the keyboard;
- highlighting the at least one key comprises highlighting the key that the first image overlaps the most in the left section of the keyboard and highlighting the key that the second image overlaps the most in the right section of the keyboard; and
- selecting the at least one key comprises selecting the key that the first image overlaps the most in the left section of the keyboard in response to receiving the first touch signal from the input detection unit when the key that the first image overlaps the most is highlighted, and selecting the key that the second image overlaps the most in the right section of the keyboard in response to receiving the second touch signal from the input detection unit when the key that the second image overlaps the most is highlighted.

5. A computer-implemented method comprising performing computer-implemented operations for:
- determining that an input device having at least one detection surface is present;
- detecting the presence of a target in proximity to one of at least two detection surfaces and generating at least one corresponding proximity signal in response thereto;
- detecting contact on the one of the at least two detection surfaces and generating at least one corresponding touch signal in response thereto;
- displaying a keyboard at a defined location on a screen of a display device separate from the at least two detection surfaces, the keyboard having a left section and a right section;
- displaying, on the left section of the keyboard, a first image indicating the presence of the target in proximity to the first detection surface with reference to the proximity signal, or displaying, on the right section of the keyboard, a second image indicating the presence of the target in proximity to the second detection surface with reference to the proximity signal, wherein at least one of the first image or the second image overlaps at least one of keys in the left section of the keyboard or keys in the right side of the keyboard;
- highlighting a defined key in the left section of the keyboard in response to the first image overlapping the keys in the left section of the keyboard, or highlighting a defined key in the right section of the keyboard in response to the second image overlapping the keys in the right section of the keyboard, wherein both highlighting the at least one key on the keyboard and displaying one or both of the first image or the second image is based at least in part on one of the first proximity signal or the second proximity signal;
- selecting a defined key in the left section of the keyboard in response to generation of the at least one corresponding touch signal when the one of the keys in the left section of the keyboard is highlighted, or selecting a defined key in the right section of the keyboard in response to generation of the at least one corresponding touch signal when the one of the keys in the right section of the keyboard is highlighted; and
- changing the defined location to a desired location on the screen of the display device in response to detecting a continuous contact on the first detection surface and further detecting, during the continuous contact, a gesture on the second detection surface.

6. The computer-implemented method of claim 5, further comprising:
- generating a mode change signal in response to detecting a particular gesture on or in proximity to the one of at least two of the detection surfaces; and
- changing the keyboard from a first type to a second type in response to generation of the mode change signal.

7. The computer-implemented method of claim 5, further comprising:
- measuring acceleration and generating corresponding acceleration signals;
- generating a mode change signal in response to generation of an acceleration signal indicating a desire by a user to change modes; and
- changing the keyboard from a first type to a second type in response to generation of the mode change signal.

8. The computer-implemented method of claim 5, further comprising, when the first image overlaps more than one key in the left section of the keyboard or when the second image overlaps more than one key in the right section of the keyboard, determining the key that the first image overlaps the most in the left section of the keyboard or the key that the second image overlaps the most in the right section of the keyboard, and
- wherein highlighting the defined key in the right section and the left section comprises highlighting the key that the first image overlaps the most in the left section of the keyboard and highlighting the key that the second image overlaps the most in the right section of the keyboard, and
- wherein selecting the defined key in the right section and the left section comprises selecting the key that the first image overlaps the most in the left section of the keyboard in response to generation of the first touch signal when the key that the first image overlaps the most is highlighted, and selecting the key that the second image overlaps the most in the right section of the keyboard in response to generation of the second touch signal when the key that the second image overlaps the most is highlighted.

9. An electronic device separate from, and externally connected to, a proximity-based input device, the electronic device comprising:
- an interface to connect the electronic device to the proximity-based input device;
- a display device; and
- a processor configured to
- display a keyboard at a defined location on a screen of the display device, the keyboard having a left section and a right section, display, on the display device, one or both of a first image overlapping the left section of the keyboard and a second image overlapping the right section of the keyboard,
   the first image indicating a presence of a target in proximity to a first detection surface of the proximity-based input device with reference to a first proximity signal that is generated by the proximity-based input device in response to detecting the presence of the target in proximity to the first detection surface and any movement or breaking thereof, the first proximity signal being received from the proximity-based input device through the interface, and
   the second image indicating a presence of the target in proximity to a second detection surface of the proximity-based input device with reference to a second proximity signal that is generated by the proximity-based input device in response to detecting the presence of the target in proximity to the second detection surface and any movement or breaking thereof, the second proximity signal being received from the proximity-based input device through the interface,
highlight one or both of
   a key in the left section of the keyboard in response to the first image overlapping the key in the left section, and
   a key in the right section of the keyboard in response to the second image overlapping the key in the right section, wherein both highlighting the one or both of the key in the left section and the key on the right section and displaying one or both of the first image or the second image is based at least in part on one of the first proximity signal or the second proximity signal, and
select one or both of
   the key in the left section of the keyboard in response to receiving a first touch signal from the proximity-based input device when the key in the left section of the keyboard is highlighted, the first touch signal being generated by the proximity-based input device in response to detecting contact on the first detection surface, or
   the key in the right section of the keyboard in response to receiving a second touch signal from the proximity-based input device when the key in the right section of the keyboard is highlighted, the second touch signal being generated by the proximity-based input device in response to detecting contact on the second detection surface; and
change the defined location to a desired location on the screen in response to detecting a continuous contact on the first detection surface and further detecting, during the continuous contact, a gesture on the second detection surface.

10. The electronic device of claim 9, wherein the processor is further configured to change the keyboard from a first type to a second type in response to receiving a mode change signal from the proximity-based input device, the mode change signal being generated by the proximity-based input device in response to detecting a particular gesture on or in proximity to at least one of the first detection surface and the second detection surface.

11. The electronic device of claim 9, wherein the processor is further configured to change the keyboard from a first type to a second type in response to receiving a mode change signal from the proximity-based input device, the mode change signal being generated by the proximity-based input device in response to receiving an acceleration signal from an accelerometer of the proximity-based input device indicating a desire by a user to change modes.

12. The electronic device of claim 9, wherein:
   when the first image overlaps more than one key in the left section of the keyboard or when the second image overlaps more than one key in the right section of the keyboard, the processor is further configured to determine which key that the first image overlaps the most in the left section of the keyboard or which key that the second image overlaps the most in the right section of the keyboard;
   highlighting the key in the left section of the keyboard comprises highlighting the key that the first image overlaps the most in the left section of the keyboard and highlighting the key that the second image overlaps the most in the right section of the keyboard; and
   selecting the key in the left section comprises selecting the key in the left section that the first image overlaps the most in response to receiving the first touch signal when the key that the first image overlaps the most is highlighted, and selecting the key that the second image overlaps the most in the right section of the keyboard in response to receiving the second touch signal when the key that the second image overlaps the most is highlighted.

13. The system of claim 1, wherein the first detection surface and the second detection surface are non-concentric and disposed substantially within the same plane.

14. The computer-implemented method of claim 5, wherein the at least two detection surfaces are non-concentric and disposed substantially within the same plane.

15. The electronic device of claim 9, wherein the first detection surface and the second detection surface are non-concentric and disposed substantially within the same plane.

\* \* \* \* \*